(12) United States Patent
Sulman (10) Patent No.: US 7,395,767 B2
(45) Date of Patent: Jul. 8, 2008

(54) GROUND ENGAGING APPARATUS

(75) Inventor: Richard Sulman, Queensland (AU)

(73) Assignee: Caplop Pty. Ltd., New South Wales (AU)

( * ) Notice: Subject to any disclaimer, the term of this patent is extended or adjusted under 35 U.S.C. 154(b) by 0 days.

(21) Appl. No.: 11/575,596

(22) PCT Filed: Sep. 21, 2005

(86) PCT No.: PCT/AU2005/001448

§ 371 (c)(1),
(2), (4) Date: Aug. 27, 2007

(87) PCT Pub. No.: WO2006/032094

PCT Pub. Date: Mar. 30, 2006

(65) Prior Publication Data

US 2008/0029002 A1 Feb. 7, 2008

(30) Foreign Application Priority Data

Sep. 24, 2004 (AU) .............................. 2004905509

(51) Int. Cl.
*A01C 5/00* (2006.01)
*A01C 7/18* (2006.01)
*A01C 13/00* (2006.01)
*A01B 49/04* (2006.01)

(52) U.S. Cl. ........................ 111/55; 111/135; 111/69; 111/151; 111/89; 172/265; 172/484

(58) Field of Classification Search ............. 111/52–63, 111/134–137, 69, 139–143, 149, 151–156, 111/89; 172/624.5, 264–268, 261, 484, 483, 172/705
See application file for complete search history.

(56) References Cited

U.S. PATENT DOCUMENTS 4,580,507 A 4/1986 Dreyer et al.

FOREIGN PATENT DOCUMENTS

AU 58706/86 12/1986

OTHER PUBLICATIONS

Derwent Abstract Acession No. B4505B/07, SU599755 A (Minsk Tractor Wks) Apr. 19, 1978.
International Search Report dated Dec. 15, 2005.

*Primary Examiner*—Christopher J. Novosad
(74) *Attorney, Agent, or Firm*—Hunton & Williams (57) ABSTRACT

A ground engaging apparatus (10) has a support plate (50) pivotally attached to a frame (100); a pair of arms (30, 40) interconnecting the support plate (50) and a shank support (60), which supports a shank (70) and ground follower (90) and first and second biasing rams or springs (200, 300), to maintain the ground follower (90); against the ground (91) but allow controlled break out of a ground opening, or tillage, tool (81) if an obstruction is engaged.

16 Claims, 7 Drawing Sheets

FIG. 16

GROUND ENGAGING APPARATUS

FIELD OF THE INVENTION

THIS INVENTION relates to agricultural apparatus, namely a ground engaging apparatus. The ground engaging apparatus is particularly suitable for, but not limited to, tillage applications and non-till seed planting.

BACKGROUND OF THE INVENTION

When planting seeds, in particular for large scale applications such as a commercial farm, a ground engaging apparatus such as a planter apparatus may be towed behind a tractor to cut channels or furrows into the soil which is followed by planting of a seed within the channel. Usually, a plurality of planter units are attached to a support towing bar that aligns the planter units at selected distances apart from each and the support bar is attachable to a tractor via a tow bar.

The ground engaging unit may comprise a frame having a pivotable parallelogram arrangement that maintains a ground opening tool in the ground while traversing level and uneven ground. A spring located between two pivotable arms of the parallelogram applies a force that maintains the ground opening tool at a pre-selected depth in the soil as the ground engaging unit encounters inclines and depressions. When the ground engaging unit encounters an obstacle such as a rock or stump, the shank is pivoted upward and away from the obstacle by a break-away or breakout mechanism to thereby prevent damage to the ground opening tool. The break-away mechanism comprises a spring that applies a force independent of the parallelogram as a separate break-away unit.

A ground engaging apparatus described in Australian patent AU 1996 60854 B2 (714157) (Techsearch Incorporated) comprises a single bias means for adjusting both a downward force to maintain the ground opening tool in the soil at a selected depth and a break-away force that maintains the ground opening tool in the soil unless the planter unit encounters an obstacle. This design is limited in that adjusting the downward force on a parallelogram arrangement also adjusts the break-away force, which is undesirable in situation where a user wishes to adjust each force independently of the other. Also, a minor adjustment of the bias means to the downward force of the parallelogram has a significant affect on the break-away force, which may result in excessive break-away force applied to the ground opening tool.

SUMMARY OF THE INVENTION

It is an object of the invention to provide an alternative or improvement to the abovementioned background art.

In a first aspect, the invention provides a ground engaging apparatus comprising:

(i) a frame;

(ii) a support plate pivotally attached to the frame about a first point;

(iii) a first bias member attached at a first end to the frame and attached at a second end to the support plate;

(iv) at least two arms each pivotally attached at respective first ends to the support plate;

(v) a shank support to which respective second ends of the at least two arms are pivotally attached;

(vi) a second bias member attached at a first end to the frame and attached at a second end to one arm of the at least two arms;

(vii) a shank attached to the shank support;

(viii) a ground opening tool attached to a free end of the shank opposite the shank support; and (ix) a ground follower attached to the shank support; wherein:

said first bias member applies a first force to the support plate urging the support plate to rotate about the first point to thereby abut a stop that obstructs rotation thereof until a counter force is applied against the ground follower or ground opening tool that is greater than the first force such that the support plate rotates about the first point in a direction away from the stop; and the second bias member applies a second force to the one arm thereby urging the ground follower against a surface and the ground opening tool into the surface.

Preferably, the apparatus comprises two arms.

Preferably, the ends of the two arms define pivotable corners of a parallelogram arrangement comprising linkages respectively comprising the two arms, the support plate and the shank support, each of which define a side of the parallelogram and respectively capable of uniform movement.

Preferably, a point at which the second end of the first bias member attaches the support plate and the respective first ends of the two arms define a first linkage of the parallelogram.

Preferably, the respective second ends of the two arms and the shank support comprise a second linkage of the parallelogram.

More preferably, the second linkage further comprises the ground follower and ground opening tool.

Preferably, the first ends of the respective two arms are capable of being vertically aligned.

Preferably, the second ends of the respective two arms are capable of being vertically aligned.

Preferably, the second bias member is attached intermediate the one arm.

Preferably, the first point is located intermediate the stop and the point at which the second end of the first bias member attaches to the support plate.

Preferably, the first bias member and second bias member each comprise a coiled spring or hydraulic cylinder.

More preferably, the first bias member is a coiled spring and the second bias member is a hydraulic cylinder.

Preferably, the first force of the first bias member and the second force of the second bias member are independently adjustable.

Preferably, the ground follower is located in front of the shank and below the at least two arms.

Preferably, the ground follower comprises a wheel.

Preferably, the frame comprises a towing attachment for attaching to a tow bar.

Preferably, one or more apparatus are attached to a tow bar via the towing attachment.

Preferably, the surface is a surface of ground for cultivation.

In a second aspect, the invention provides a ground engaging assembly comprising a plurality of ground engaging apparatus of the first aspect each attached to a same tow bar.

Preferably, the ground engaging assembly further comprises a seed dispenser located adjacent to each ground opening tool such that in use one or more seed may be placed within a channel formed in the ground by the ground opening tool.

More preferably, the seed dispenser is located behind the ground opening tool at an end opposite a cutting end.

It will be appreciated that the present invention comprises at least two bias members for respectively providing a downward force to maintain the ground opening tool in the ground when traversing level, risen or depressed ground and a breakout force that maintains the ground opening tool in the ground unless an obstruction or obstacle is encountered. The invention preferably has the advantage of adjusting the downward force and breakout force independently of each other. The invention in a preferred embodiment combines the two bias members in a compact and efficient configuration such that both bias members are located in front of a wheel or ground follower as described herein.

Throughout this specification unless the context requires otherwise, the word "comprise", and variations such as "comprises" or "comprising", will be understood to imply the inclusion of the stated integers or group of integers or steps but not the exclusion of any other integer or group of integers.

DESCRIPTION OF THE DRAWINGS

In order that the invention may be readily understood and put into practical effect, preferred embodiments will now be described by way of example with reference to the accompanying drawings wherein like reference numerals refer to like parts and wherein.

DETAILED DESCRIPTION OF THE INVENTION

Terms used herein when referring to an item or integer are not intended to suggest or imply any limitation to the structure or function of the item or integer.

Figure 1:
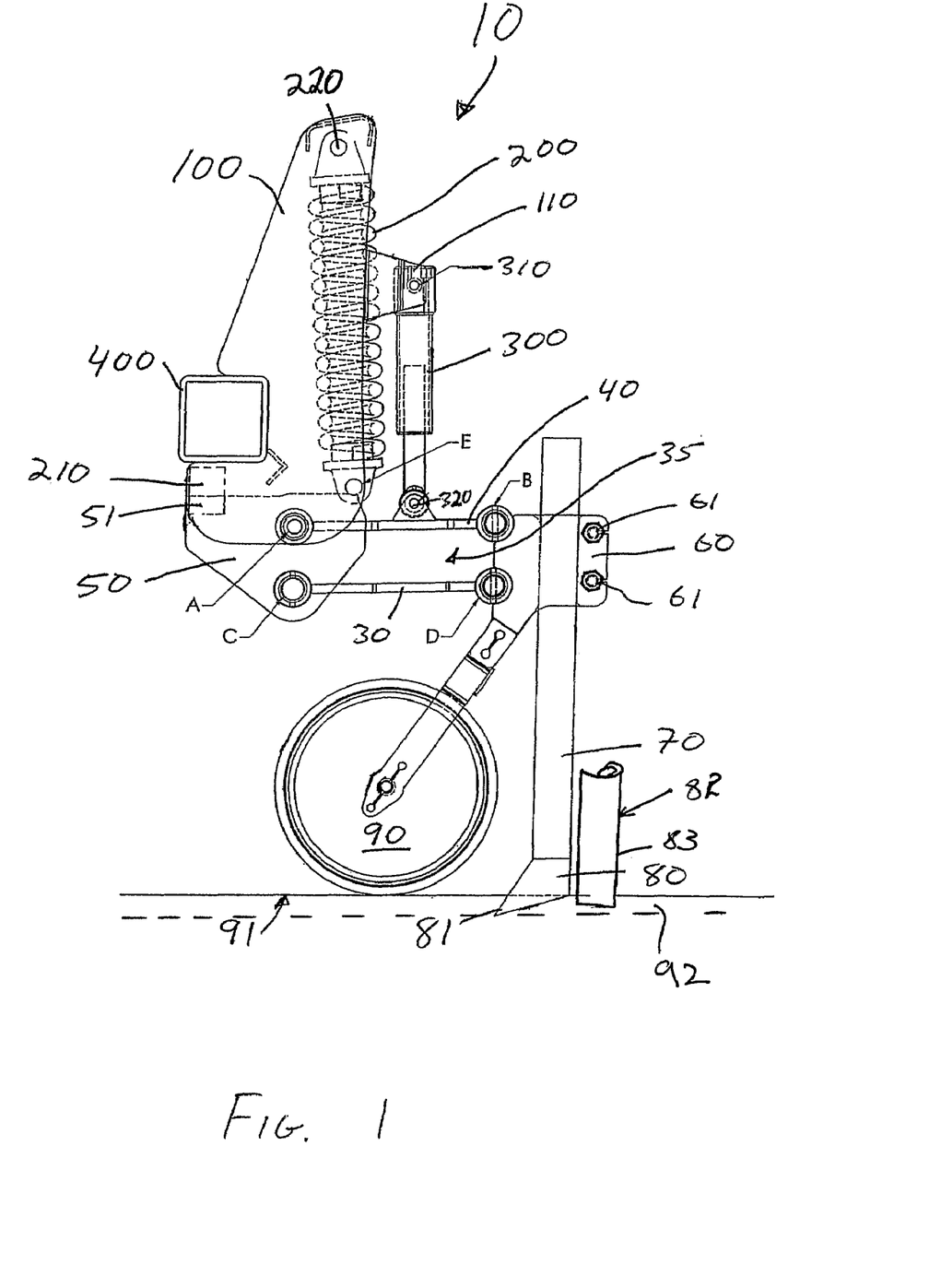
FIG. 1 shows a side view of a ground engaging apparatus of the invention on level ground and first bias member in phantom.

FIG. 1 shows a side view of a ground engaging apparatus 10 comprising a support plate 50, a shank support 60 and two arms 30, 40 each pivotally attached at opposites ends to said support plate 50 and shank support 60 thereby forming sides of a parallelogram 35. Attachment points A, B, C and D of ends of arms 30, 40 generally define corners of the parallelogram 35. Accordingly, plate 50 and shank support 60 effectively form part of the parallelogram 35. A shank 70, also referred to as a tine, tyne, tine shank or tyne shank, is attached to the shank support 60 and is adjustable relative thereto by loosening and tightening bolts 61. A ground opening tool 80 that is adapted to disrupt the ground 91, preferably forming a channel suitable for planting seeds, is attached to the shank 70 at a free end opposite the shank support 60. A ground follower 90, shown as a wheel, is attached to shank support 60 and located in front of the ground opening tool 80 at a leading end digging tip 81 of the ground opening tool 80. The wheel 90 contacts the ground 91 as shown and in use assists with guiding and positioning the ground engaging apparatus 10, in particular the ground opening tool 80.

The support plate 50 is pivotally attached to a frame 100 at attachment point A (also referred to herein as a first point). A first bias member 200 is attached to the support plate 50 at pivotable attachment point E and attached to the frame 100 at point 220 as shown in FIG. 1. The first bias member 200 applies a downward force, referred to herein as an applied breakout force, against plate 50 that is countered by stop 210 when there is no reaction or counter breakout force applied to the ground opening tool 80 as discussed hereinafter. Point A is preferably located intermediate the stop 210 and point E, where the first bias member 200 attaches to the support plate 50. Adjusting the distance of the pivot point A to the stop 210 and point E preferably adjusts a force applied by the second bias member 200 about point A. A second bias member 300 is attached at a first end 310 to the housing 100 by member 110 and at a second end 320 to arm 40 as shown in FIG. 1. The second bias member 300 applies a downward force onto the parallelogram 35 at point 320, which is preferably intermediate arm 40. The applied downward force directs the ground opening tool 80 into the ground 91 and is countered by the ground follower 90.

One or more ground engaging apparatus 10 may be attached to a towing cross bar via towing attachment 400 thereby forming a ground engaging assembly. It will be appreciated that preferably there are a plurality of ground engaging apparatus 10 attached to a towing cross bar, which is attachable to a tractor, car, truck, horse, mule, ox or other means for pulling the ground engaging apparatus 10. Preferably, a seed dispenser 82 such as a planting tube 83 is located adjacent to the ground opening tool 80 so that one or more seeds may be deposited within a channel or furrow 92 cut by the ground opening tool 80 when in use. Other substances may be deposited into the channel 92, for example fertiliser and the like.

FIGS. 2 to 5 and 10 to 12 show side views and line diagrams of the ground engaging apparatus 10 in various configurations when traversing different ground levels and when retracted. In these configurations, points A and C are substantially vertically aligned and points B and D are substantially vertically aligned as shown and arms 30, 40 pivot about points A, B, C and D. First bias member 200 maintains a constant applied downward breakout force that is countered by stop 210. The second bias member 300 applies a downward force against the parallelogram 35 and a change in ground elevation 91 results in extension and retraction of a hydraulic cylinder of the second bias member 300.

The parallelogram 35 is defined by points A, B, C and D and sides of the parallelogram comprise arms 30, 40, support plate 50 and shank support 60. As shown in FIGS. 10-15, points E, A and C form a first single linkage that is capable of uniform movement and points B, D and shank 60 form a second single linkage that is capable of uniform movement.

Figure 2:
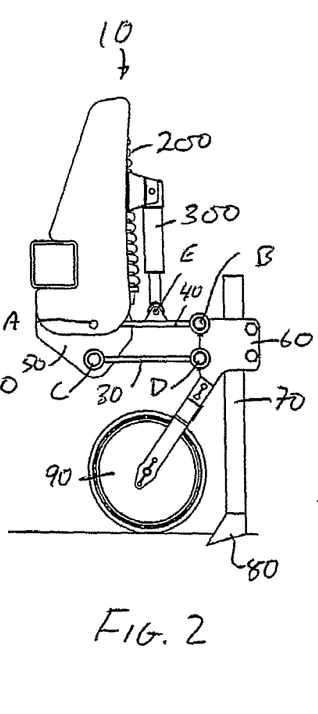
FIG. 2. shows a side view of the ground engaging apparatus traversing level ground without breakout.
Figure 10:
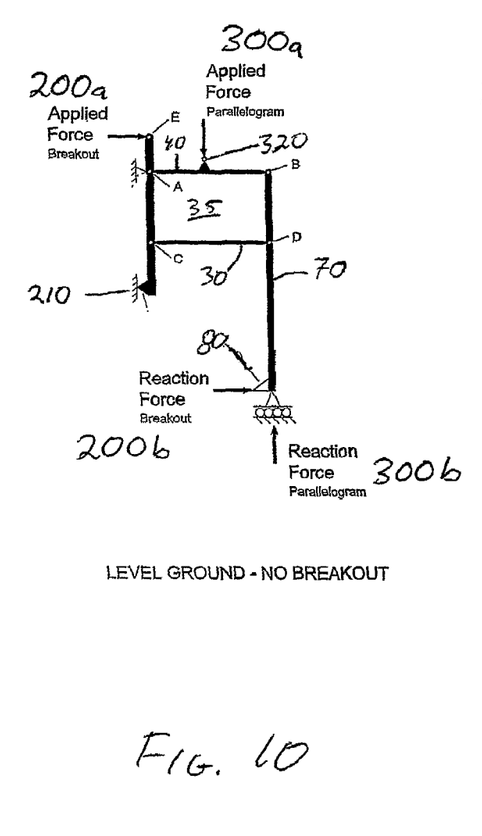
FIG. 10 is another representation of a line diagram of the ground engaging apparatus traversing level ground without breakout.

FIGS. 2 and 10 show the ground engaging apparatus 10 in a configuration wherein the ground engaging apparatus 10 is on level ground. As shown, the arms 30, 40 are substantially parallel with the surface of the ground 91 and attachment points A and C are substantially aligned vertically with each other and attachment points B and D are also substantially aligned vertically with each other thereby forming a generally rectangular configuration of the parallelogram 35. A downward second force 300a applied by second bias member 300 directs the ground opening tool 80 into the ground 91 and is countered by the ground follower 90. An applied breakout first force 200a applies a force preventing the ground opening tool 80 from breakout unless a sufficient reaction breakout force 200b is encountered as described hereinafter.

Figure 3:
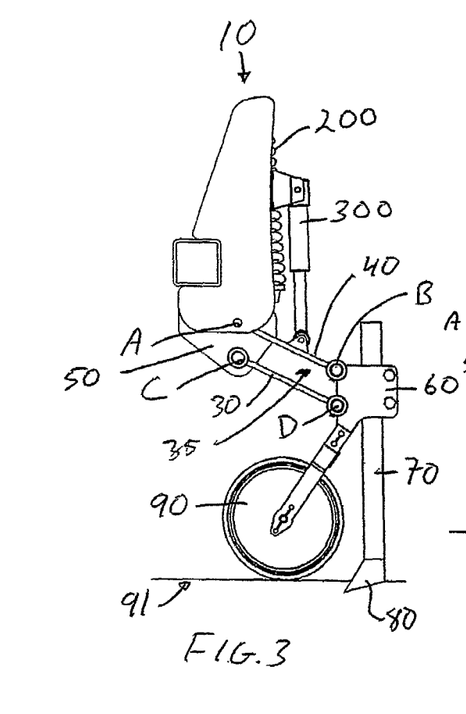
FIG. 3 shows a side view of the ground engaging apparatus traversing a depression in the ground without breakout.
Figure 11:
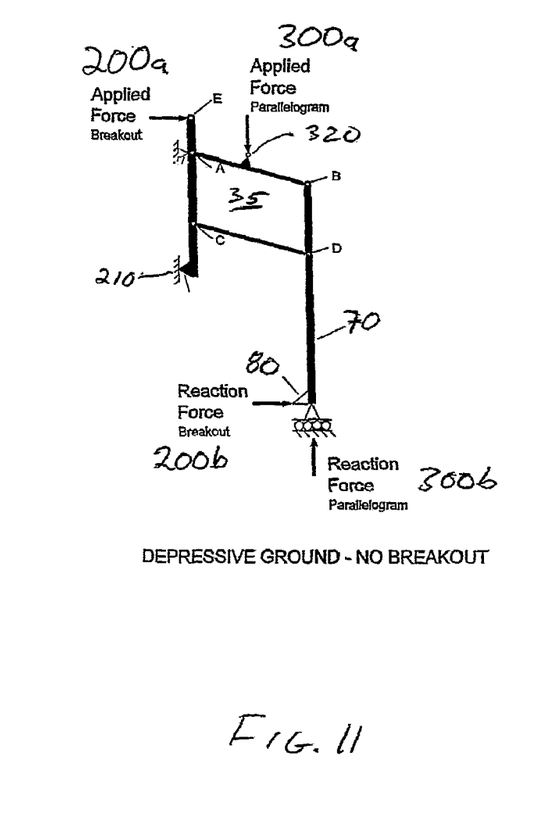
FIG. 11 is a line diagram of the ground engaging apparatus traversing a depression without breakout.

FIGS. 3 and 11 show a ground engaging apparatus 10 in a configuration wherein the ground engaging apparatus 10 is traversing a depression in the ground. In this configuration, arms 30, 40 are pivoted downward thereby lowering points B and D respectively below points A and C. Points B and D are each attached to shank support 60 such that shank support 60 effectively forms an end of the parallelogram defined by points A, B, C and D. Accordingly, when the arms 30, 40 are lowered as shown in FIG. 3, shank support 60 is lowered thereby maintaining the ground opening tool 80 in the ground 91. The shank 70 remains substantially vertical. The second bias member 300 is shown extended.

Figure 4:
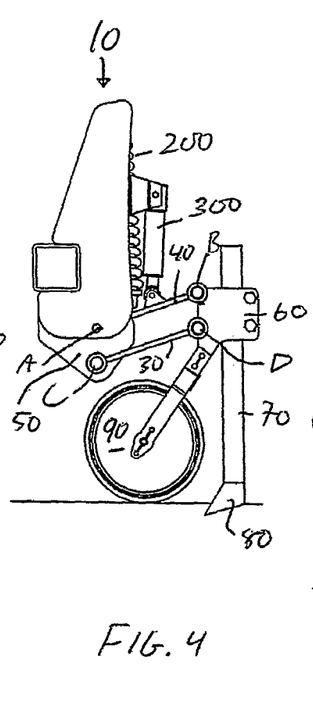
FIG. 4 shows a side view of the ground engaging apparatus traversing risen ground without breakout.
Figure 12:
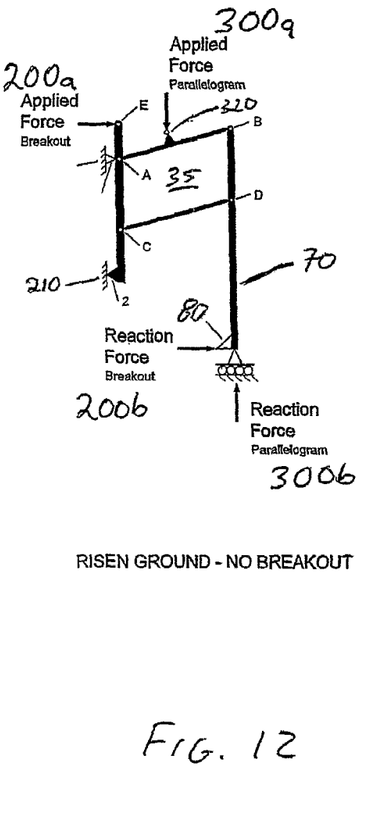
FIG. 12 is a line diagram of the ground engaging apparatus traversing risen ground without breakout.

FIGS. 4 and 12 show the ground engaging apparatus 10 in a configuration when traversing risen ground 91. The second bias member 300 is shown retracted and arms 30, 40 are angled upward such that points B and D are above respective points A and C as shown.

Figure 5:
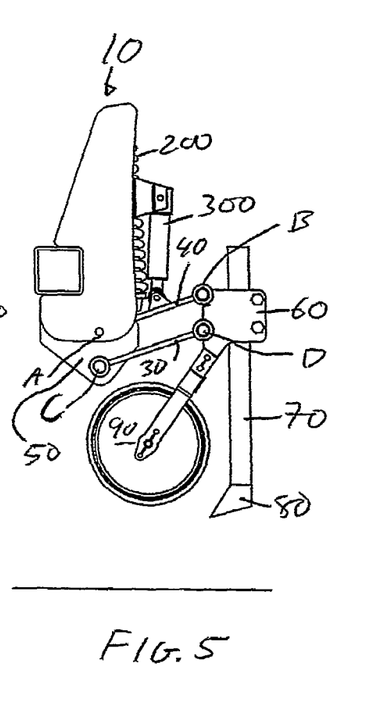
FIG. 5 shows a side view of the ground engaging apparatus retracted.

FIG. 5 shows the ground engaging apparatus 10 retracted such that the ground opening tool 80 no longer contacts the ground 91. This is useful, in particular, when a plurality of ground engaging apparatus 10 are attached to a support towing bar and only selected ground opening tools 80 are in use. This may be suitable for example when adjusting spacing between planting rows of a crop. The present invention has the advantage of being compact in horizontal length, preferably when the ground opening tool 80 is retracted. As shown, the shank support 60 is lifted substantially vertically with minimum or no outward horizontal extension of the shank 70. This provides a compact configuration of the ground engaging apparatus 10, which is advantageous when compared with other ground engaging apparatus. For example, this configuration is preferred if seed boxes are fitted as the boxes are maintained horizontally level.

FIGS. 6 to 8 and 13 to 15 show the ground engaging apparatus 10 in a configuration wherein the ground opening tool 80 encounters an obstacle such as a rock, branch, stump or the like. It is desirable that the ground opening tool 80 is moved away from the ground 91 and obstacle or obstruction to prevent or minimise damage to any part of the ground engaging apparatus. This movement of the ground opening tool 80 away from the ground 91 is referred to herein as a "breakout" or "breakaway" as the support plate 50 is rotated about point A thereby moving an end 51 of the support plate 50 away from the stop 210. The first bias member 200 applies a breakout force 200a as shown in FIGS. 9 and 10-15 that prevents the ground opening tool 80 from breaking away unless the ground opening tool 80 encounters a reaction force 200b greater than the applied breakout force 200a applied at point E by the first bias member.

Figure 6:
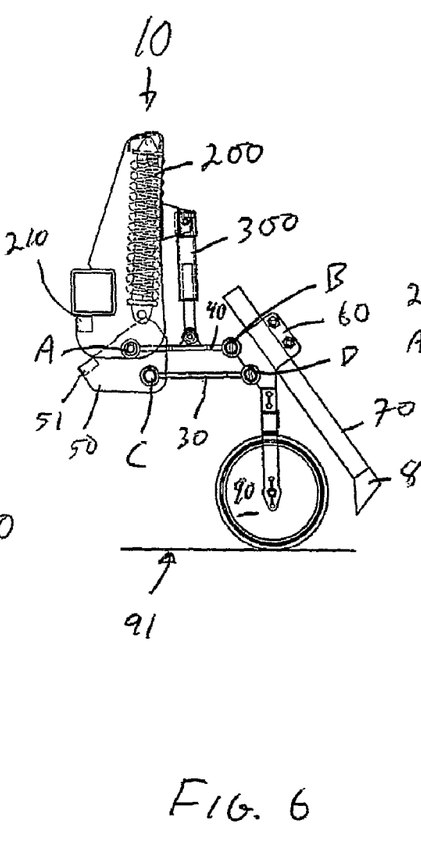
FIG. 6 shows a side view of the ground engaging apparatus traversing level ground in a breakout configuration.
Figure 13:
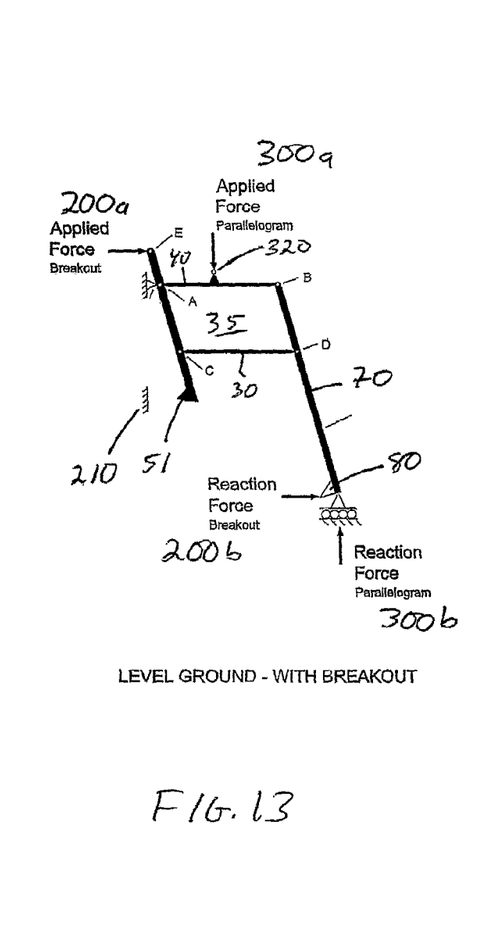
FIG. 13 is a line diagram of the ground engaging apparatus traversing level ground with breakout.

FIGS. 6 and 13 show the ground engaging apparatus 10 in a breakout configuration when traversing level ground. An applied breakout force 200a prevents the ground opening tool 80 from breakout unless a sufficient reaction breakout force 200b is encountered, e.g. hitting an obstacle such as a rock or stump. When an obstacle is encountered, a reaction breakout force 200b shown in FIG. 13 moves shank 70 as shown thereby shifting arm 30 rearward thereby causing the support plate 50 to rotate counter clockwise about point A. As the wheel 90 and shank 70 are attached to shank support 60, the breakout force is transferred via a side of the parallelogram 35 defined by points B and D effectively as a single link as shown in FIG. 13.

Figure 7:
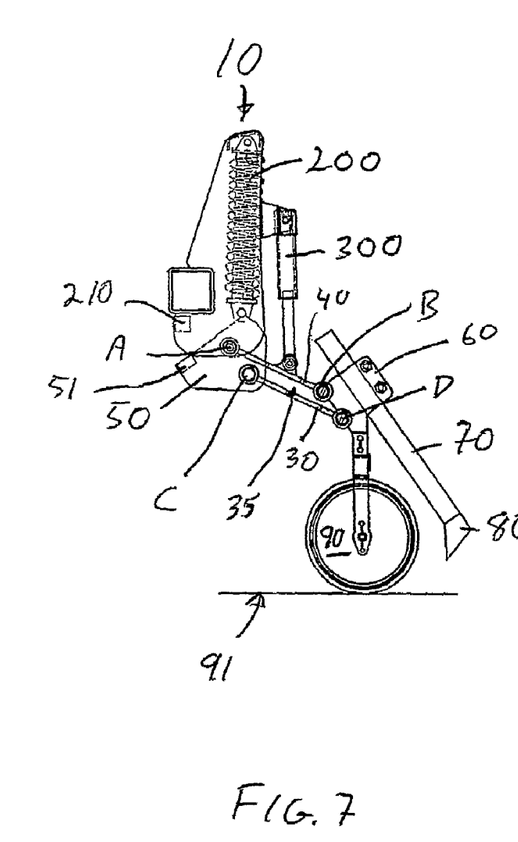
FIG. 7 shows a side view of the ground engaging apparatus traversing a depression in a breakout configuration.
Figure 8:
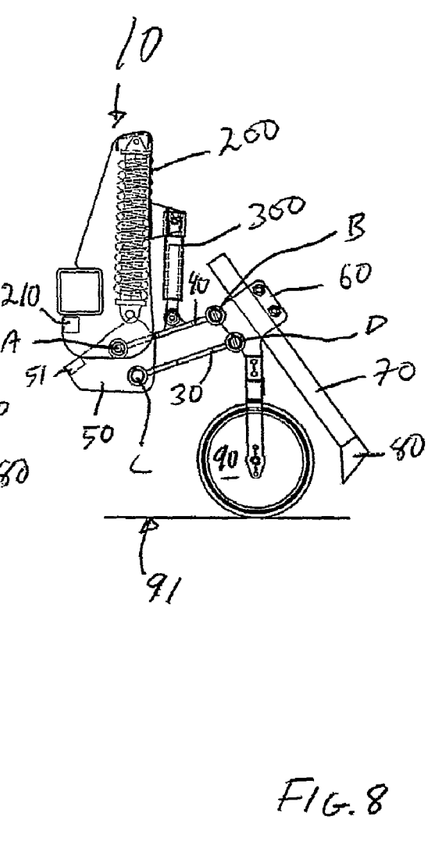
FIG. 8 is a side view of the ground engaging apparatus traversing risen ground in a breakout configuration.
Figure 9:
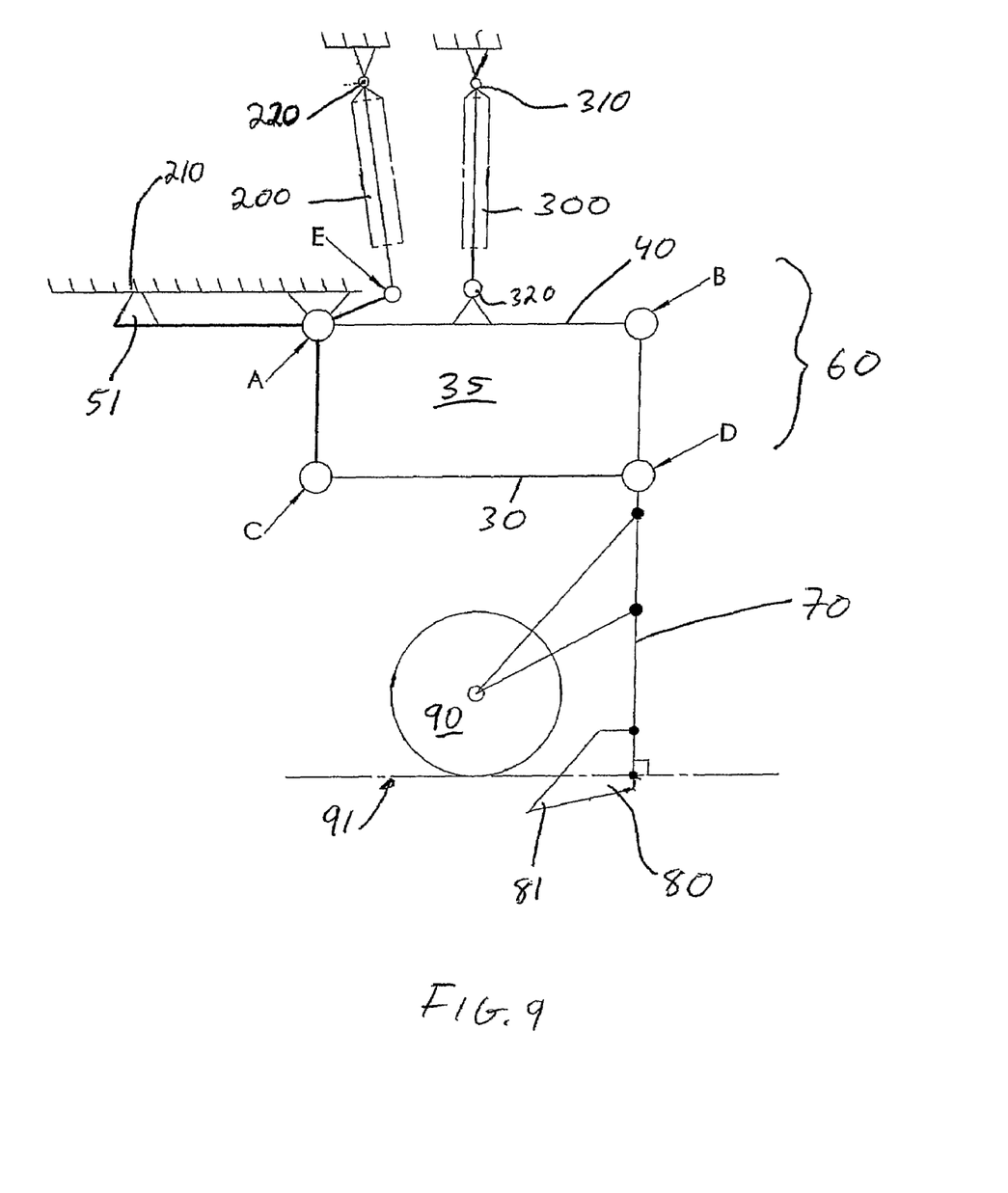
FIG. 9 is a line diagram of the ground engaging apparatus traversing level ground without breakout.
Figure 14:
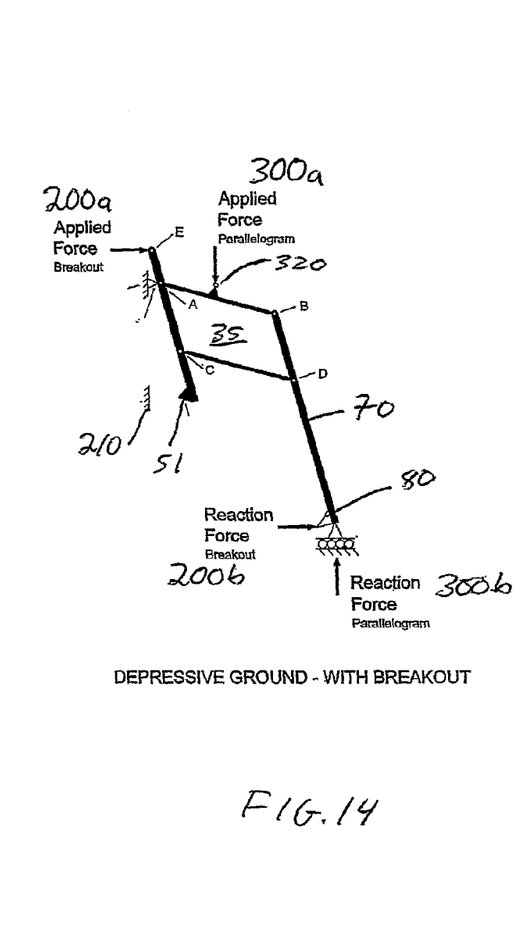
FIG. 14 is a line diagram of the ground engaging apparatus traversing a depression with breakout.
Figure 15:
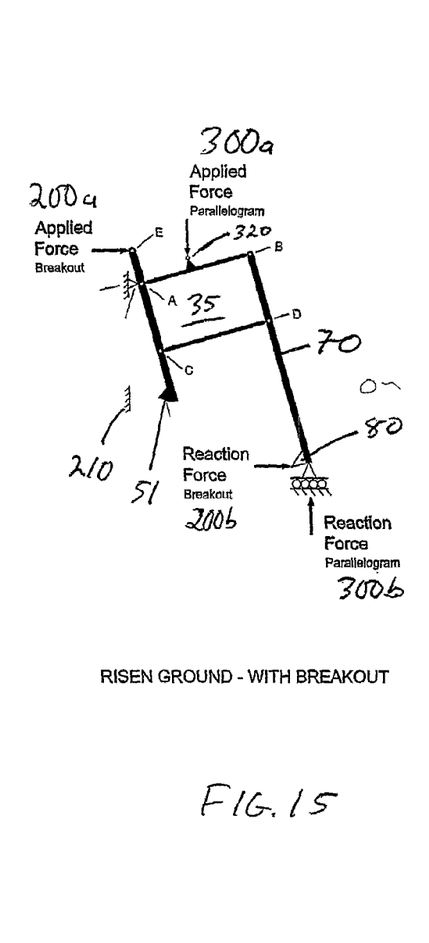
FIG. 15 is a line diagram of the ground engaging apparatus traversing risen ground with breakout.

FIGS. 7 and 14 show the ground engaging apparatus 10 in a breakout configuration when traversing a depression and FIGS. 8 and 15 show the ground engaging apparatus 10 in a breakout configuration when traversing risen ground. Similar applied and breakout forces as previously illustrated are shown.

Figure 16:
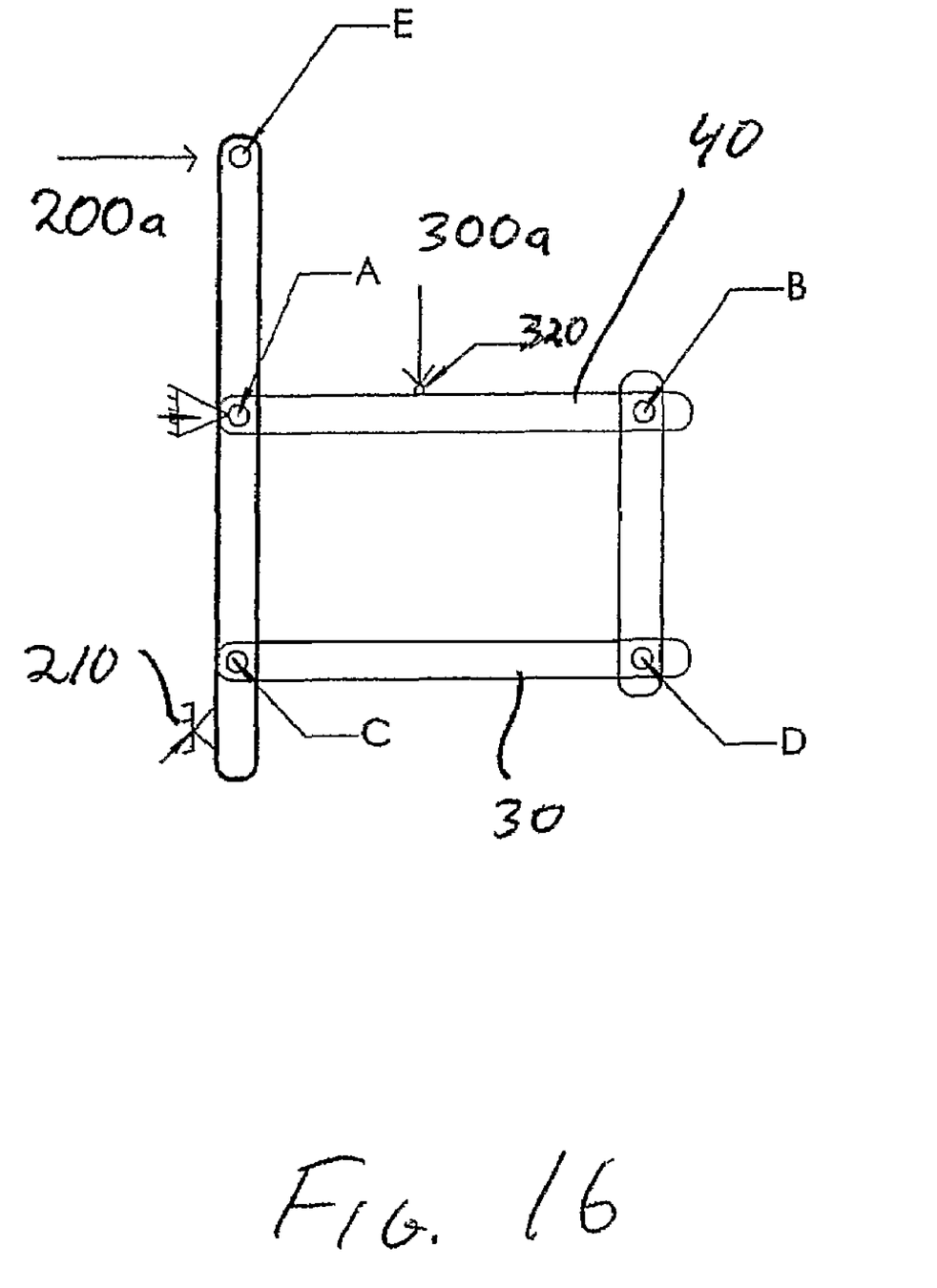
FIG. 16 is another diagram illustrating preferred structures and applied forces of the ground engaging apparatus.

FIG. 16 shows another diagram representing the structural components of the invention with applied forces indicated. As shown in FIG. 16, a first bias member applies a dominant breakout force 200a to resist breakout away from abutment point 210, which is represented in FIG. 1 as stop 210. The breakout force 200a is applied to a vertical link defined by points E, A and C, wherein point A is a fixed pivot point. A second bias means applies a smaller downward force 300a to the parallelogram 35, preferably via arm 40. The second bias member 300 provides independent adjustment of the downward force 300a without affecting the applied breakout force 200a. In a preferred embodiment wherein the second bias member 300 comprises a hydraulic cylinder, another benefit is an ability to adjust the second bias member 300 without a need to manually adjust the mechanism.

First bias member 200 and second biased member 300 may comprise a spring, hydraulic cylinder or other bias member. Preferably, the first bias member 200 is a coiled spring and the second bias member 300 is a hydraulic cylinder as shown. Use of a hydraulic (or pneumatic) cylinder is advantageous in that adjustment of a force applied by the bias member may be performed remotely for one or more bias members by adjusting a fluid pressure. The fluid may be air, oil, water or any other suitable fluid. In a preferred form of the invention, in use a user is capable of driving a tractor that is towing one or more ground engaging apparatus 10 and the force of the first bias member 200 and/or second bias member 300 may be adjusted from the tractor without needing to manually adjusting an applied force for each bias member.

It will also be appreciated that the ground follower comprises a wheel, sled, cutting disc, roller or other suitable device. In one embodiment, the ground engaging apparatus comprises both a wheel and a cutting disc for slicing through weeds and other plant material in a path of the apparatus.

The ground opening tool comprises devises and configurations including for example seed shoes, plough shares, seed openers, furrow openers, disc openers, cutting edges and the like. It will also be appreciated that the present invention is preferably used with a seed dispenser such as a seed tube or planter tube that releases one or more seeds in a channel 92 formed by the ground opening tool 80. Although there is no need to deposit any material in the channel, preferably seeds, fertiliser, wetting agent or other agricultural material is dispensed in the channel. The seeds may be for any crop, including for example, a vegetable or fruit including a cereal crop, wheat, rice, barley, corn, lettuce and the like.

Although the invention has been shown and described with exemplary embodiments thereof, it should be understood by those skilled in the art that the foregoing and various other changes, omissions and additions may be made therein and thereto without departing from the scope of the invention.

The disclosure of each patent and other document referred to in this specification is incorporated by reference in its entirety.

The invention claimed is:

1. A ground engaging apparatus comprising:
   i) a frame;
   ii) a support plate pivotally attached to the frame about a first point;
   iii) a first bias member attached at a first end to the frame and attached at a second end to the support plate;
   iv) at least two arms each pivotally attached at respective first ends to the support plate;
   v) a shank support to which respective second ends of the at least two arms are pivotally attached;
   vi) a second bias member attached at a first end to the frame and attached a second end to one arm of the at least two arms;
   vii) a shank attached to the shank support;
   viii) a ground opening tool attached to a free end of the shank opposite the shank support; and
   ix) a ground follower attached to the shank support;
   wherein:
   said first bias member applies a first force to the support plate urging the support plate to rotate about the first point to thereby abut a stop that obstructs rotation thereof until a counter force is applied against the ground follower or ground opening tool that is greater than the first force such that the support plate rotates about the first point in a direction away from the stop; and
   the second bias member applies a second force to the one arm thereby urging the ground follower against a surface and the ground opening tool into the surface.

2. An apparatus as claimed in claim 1 wherein:
the apparatus has two arms.

3. An apparatus as claimed in claim 1, wherein:
the ends of the two arms define pivotable corners of a parallelogram arrangement comprising linkages respectively comprising the two arms, the support plate and the shank support, each of which define a side of the parallelogram and respectively capable of uniform movement.

4. An apparatus as claimed in claim 3 wherein:
a point at which the second end of the first bias member attaches the support plate and the respective first ends of the two arms define a first linkage of the parallelogram.

5. An apparatus as claimed in claim 4 wherein:
the respective second ends of the two arms and the shank support comprise a second linkage of the parallelogram; and
the second linkage further comprises the ground follower and ground opening tool.

6. An apparatus as claimed in claim 4 wherein:
the first point is located intermediate the stop and the point at which the second end of the first bias member attaches to the support plate.

7. An apparatus as claimed in claim 3 wherein:
the first ends of the respective two arms are capable of being vertically aligned; and
the second ends of the respective two arms are capable of being vertically aligned.

8. An apparatus as claimed in claim 1 wherein:
the second bias member is attached intermediate the one arm.

9. An apparatus as claimed in claim 1 wherein:
the first bias member and second bias member each comprise a coiled spring or hydraulic cylinder.

10. An apparatus as claimed in claim 9 wherein:
the first bias member is a coiled spring and the second bias member is a hydraulic cylinder.

11. An apparatus as claimed in claim 9 wherein:
the first force of the first bias member and the second force of the second bias member are independently adjustable.

12. An apparatus as claimed in claim 1 wherein:
the ground follower is located in front of the shank and below the at least two arms; and
the ground follower comprises a wheel.

13. An apparatus as claimed in claim 1, wherein:
the frame comprises a towing attachment for attaching to a tow bar; and
one or more apparatus are attached to a tow bar via the towing attachment.

14. A ground engaging assembly comprising a plurality of ground engaging apparatus as claimed in claim 1 each attached to the same tow bar.

15. The assembly as claimed in claim 14, and further comprising a seed dispenser located adjacent to each ground opening tool such that in use one or more seed may be placed within a channel formed in the ground by the ground opening tool.

16. The assembly as claimed in claim 15 wherein:
the seed dispenser is located behind the ground opening tool at an end opposite a cutting end.

* * * * *